US008880775B2

(12) United States Patent  
Stefanus et al.

(10) Patent No.: US 8,880,775 B2  
(45) Date of Patent: Nov. 4, 2014

(54) SYSTEM AND METHOD OF GARBAGE COLLECTION IN A MEMORY DEVICE

(75) Inventors: Stefanus Stefanus, Singapore (SG); Feng Shen, Singapore (SG); Wei Loon Ng, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 967 days.

(21) Appl. No.: 12/142,915

(22) Filed: Jun. 20, 2008

(65) Prior Publication Data

US 2009/0319720 A1   Dec. 24, 2009

(51) Int. Cl.
| | |
|---|---|
| *G06F 12/00* | (2006.01) |
| *G06F 13/00* | (2006.01) |
| *G06F 13/28* | (2006.01) |
| *G06F 12/02* | (2006.01) |

(52) U.S. Cl.
CPC .... *G06F 12/0246* (2013.01); *G06F 2212/7205* (2013.01); *G06F 2212/1028* (2013.01); *G06F 2212/1016* (2013.01)
USPC .... 711/103; 711/112; 711/159; 711/E12.009; 711/E12.083

(58) Field of Classification Search
CPC ............... G06F 12/0246; G06F 2212/1016; G06F 2212/1028; G06F 2212/7205
USPC ........... 711/103, 112, 159, E12.009, E12.083
See application file for complete search history.

(56) References Cited

U.S. PATENT DOCUMENTS

| | | | |
|---|---|---|---|
| 6,209,003 B1 | 3/2001 | Mattis et al. .................. 707/206 |
| 6,353,838 B2 | 3/2002 | Sauntry et al. ................ 707/206 |
| 6,502,111 B1 | 12/2002 | Dussud .......................... 707/206 |
| 6,629,113 B1 | 9/2003 | Lawrence ..................... 707/206 |
| 6,671,707 B1 | 12/2003 | Hudson ......................... 707/206 |
| 6,892,212 B2 | 5/2005 | Shuf et al. ..................... 707/206 |
| 6,898,611 B1 | 5/2005 | Dussud et al. ................ 707/206 |
| 6,937,148 B2 | 8/2005 | Irwin ......................... 340/539.1 |
| 7,065,617 B2 | 6/2006 | Wang ............................. 711/159 |
| 7,085,789 B1 | 8/2006 | Tarditi ........................... 707/206 |
| 7,089,273 B2 | 8/2006 | Wu et al. ....................... 707/206 |
| 7,216,137 B2 | 5/2007 | Shpeisman et al. .......... 707/206 |
| 7,310,655 B2 | 12/2007 | Dussud ......................... 707/206 |
| 7,310,718 B1 | 12/2007 | Liang et al. .................. 711/170 |
| 7,774,390 B2 * | 8/2010 | Shin .............................. 707/814 |
| 8,209,503 B1 * | 6/2012 | Smith ........................... 711/154 |
| 2002/0051394 A1 * | 5/2002 | Tobita et al. .................. 365/221 |
| 2002/0194210 A1 | 12/2002 | Subramoney et al. ........ 707/206 |
| 2003/0069905 A1 | 4/2003 | Dussud ......................... 707/206 |
| 2003/0084077 A1 | 5/2003 | Shpeisman et al. .......... 707/206 |
| 2004/0158589 A1 | 8/2004 | Liang et al. .................. 707/206 |
| 2004/0199742 A1 | 10/2004 | Wang ............................. 717/170 |
| 2004/0248612 A1 * | 12/2004 | Lee et al. ................... 455/550.1 |
| 2005/0027761 A1 | 2/2005 | Wu et al. ....................... 707/206 |
| 2005/0033781 A1 | 2/2005 | Dussud ......................... 707/206 |
| 2005/0114413 A1 | 5/2005 | Subramoney et al. ........ 707/206 |

(Continued)

FOREIGN PATENT DOCUMENTS

EP          0 745 939 A2    12/1996

*Primary Examiner* — Sheng-Jen Tsai (74) *Attorney, Agent, or Firm* — Westman, Champlin & Koehler, P.A.

(57) ABSTRACT

In a particular embodiment, a controller is adapted to perform a garbage collection operation to remove redundant data, to predict a performance parameter associated with performance of the garbage collection operation, and to abort the garbage collection operation when the predicted performance parameter exceeds a threshold.

16 Claims, 7 Drawing Sheets

(56) References Cited

U.S. PATENT DOCUMENTS

| | | |
|---|---|---|
| 2005/0129235 A1 | 6/2005 | Little et al. .................. 380/255 |
| 2005/0144365 A1 | 6/2005 | Gorobets et al. ............. 711/103 |
| 2005/0166005 A1 | 7/2005 | Nagano et al. ................ 711/103 |
| 2005/0198088 A1 | 9/2005 | Subramoney et al. ........ 707/206 |
| 2005/0235120 A1 | 10/2005 | Dussud ......................... 711/159 |
| 2005/0273567 A1 | 12/2005 | Blandy ......................... 711/170 |
| 2005/0273568 A1 | 12/2005 | Blandy ......................... 711/170 |
| 2006/0053246 A1* | 3/2006 | Lee ............................... 711/100 |
| 2006/0059453 A1 | 3/2006 | Kuck et al. ................... 717/100 |
| 2006/0085433 A1 | 4/2006 | Bacon et al. ................. 707/100 |
| 2006/0085494 A1 | 4/2006 | Dussud et al. ................ 707/206 |
| 2006/0230087 A1 | 10/2006 | Andreasson .................. 707/206 |
| 2006/0259528 A1 | 11/2006 | Dussud et al. ................ 707/206 |
| 2006/0294165 A1 | 12/2006 | Bacon et al. ................. 707/206 |
| 2007/0016633 A1 | 1/2007 | Lindholm et al. ............ 707/206 |
| 2007/0033240 A1 | 2/2007 | Barsness et al. .............. 707/206 |
| 2007/0043900 A1 | 2/2007 | Yun ............................... 711/103 |
| 2007/0073793 A1 | 3/2007 | Blandy ......................... 707/206 |
| 2007/0118579 A1 | 5/2007 | Hudson ......................... 707/206 |
| 2007/0130238 A1 | 6/2007 | Harris et al. .................. 707/206 |
| 2007/0162526 A1* | 7/2007 | Printezis et al. .............. 707/206 |
| 2007/0162527 A1 | 7/2007 | Wright et al. ................. 707/206 |
| 2007/0174579 A1* | 7/2007 | Shin ............................... 711/170 |
| 2007/0174667 A1 | 7/2007 | Brey et al. ........................ 714/6 |
| 2007/0186032 A1* | 8/2007 | Sinclair et al. ................. 711/103 |
| 2007/0198617 A1 | 8/2007 | Joisha ............................ 707/206 |
| 2007/0255773 A1 | 11/2007 | Simeonov et al. ............ 707/206 |
| 2007/0255774 A1 | 11/2007 | Topchiyski .................... 707/206 |
| 2007/0255909 A1 | 11/2007 | Gschwind et al. ............ 711/147 |
| 2007/0255950 A1 | 11/2007 | Asanuma et al. ............. 713/168 |
| 2007/0260654 A1 | 11/2007 | Creamer et al. .............. 707/206 |
| 2007/0260843 A1 | 11/2007 | Creamer et al. .............. 711/170 |
| 2007/0294499 A1 | 12/2007 | Garthwaite .................... 711/170 |
| 2008/0005520 A1 | 1/2008 | Siegwart et al. .............. 711/170 |
| 2008/0016427 A1 | 1/2008 | Namekawa et al. ........... 714/758 |
| 2008/0024899 A1* | 1/2008 | Chu et al. ........................ 360/69 |
| 2008/0028775 A1 | 2/2008 | Ausseil et al. ..................... 62/91 |
| 2008/0034174 A1 | 2/2008 | Traister et al. ................ 711/159 |
| 2008/0034175 A1* | 2/2008 | Traister et al. ................ 711/159 |
| 2008/0082596 A1 | 4/2008 | Gorobets ....................... 707/206 |
| 2008/0082728 A1 | 4/2008 | Traister et al. ................ 711/103 |
| 2008/0086619 A1 | 4/2008 | Traister et al. ................ 711/170 |
| 2008/0098054 A1 | 4/2008 | Carmody et al. ............. 707/206 |
| 2008/0244545 A1* | 10/2008 | Jamison ........................ 717/153 |
| 2008/0279005 A1* | 11/2008 | France ........................ 365/185.11 |
| 2009/0100307 A1* | 4/2009 | Lee ............................... 714/746 |
| 2009/0172386 A1* | 7/2009 | Tomlin et al. ................. 713/100 |
| 2009/0265508 A1* | 10/2009 | Bennett et al. ................ 711/103 |
| 2010/0146197 A1* | 6/2010 | Gorobets ....................... 711/103 |
| 2012/0266180 A1* | 10/2012 | Arimilli et al. ............... 718/105 |

\* cited by examiner

SYSTEM AND METHOD OF GARBAGE COLLECTION IN A MEMORY DEVICE

FIELD OF THE DISCLOSURE

The present disclosure is generally related to a system and method of garbage collection in a memory device. More particularly, the present disclosure is related to a system and method of performing garbage collection in solid-state and hybrid memory devices.

BACKGROUND

Flash memory devices are becoming increasingly important for embedded systems because such memory devices have many attractive features, including small size, fast access speeds, shock resistance, and low weight. In some instances, a NAND flash memory may only allow write-after-erase operations, and re-write operations are not permitted. To improve write performance, a logical block address location is mapped to different physical locations inside of the NAND flash memory. However, this can introduce redundant data that has been overwritten but still occupies physical space within the NAND flash memory. Such redundant data is sometimes referred to as "garbage."

In some instances, a garbage collection operation is performed to remove the redundant data. In general, garbage collection requires a long time due to a long programming time of the NAND flash memory. In a particular example, a typical garbage collection operation copies valid data page-by-page to another free location and then erases the freed block. In general, copying of each page takes time, and each block typically includes 64 pages of data (128 kilobytes of data). In general, the time needed to free a block of data is dependent on the particular system. In a particular example, given the time to copy a page and given the number of pages to be copied, a particular embodiment of a system can include a flash memory that has a garbage collection rate of about 6.4 megabytes per second. In this instance, the garbage collection operations may be slow as compared to a host-to-device transfer rate of the system. In a particular example, a system can have a host-to-device transfer rate of 66 megabytes per second or more. Hence, a garbage collection operation can be much slower than transfer operations and can decreases the overall performance of the system. Further, a garbage collection operation consumes power for each page of data that is to be removed. When a power supply is limited (such as with a battery power supply), garbage collection at a particular point in time may consume too much power for the particular operating conditions of the device.

SUMMARY

In a particular embodiment, a controller is adapted to perform a garbage collection operation to remove redundant data from a storage media, to predict a performance parameter associated with performance of the garbage collection operation, and to abort the garbage collection operation when the predicted performance parameter exceeds a threshold.

In another particular embodiment, a storage device is disclosed that includes a solid-state memory adapted to store multiple data blocks including one or more redundant data blocks and a controller adapted to perform a garbage collection operation to remove redundant data when the storage device is an idle mode of operation. When the storage device is in an active mode of operation, the controller is adapted to predict a performance parameter associated with performance of the garbage collection operation and to abort the garbage collection operation when the predicted performance parameter exceeds a performance threshold.

In still another particular embodiment, a method is disclosed that includes initiating a garbage collection operation to remove redundant data from a storage media of a storage device. The method further includes predicting a performance parameter associated with execution of the garbage collection operation and aborting the garbage collection operation prior to execution when the performance parameter exceeds a performance threshold.

DETAILED DESCRIPTION OF ILLUSTRATIVE EMBODIMENTS

Figure 1:
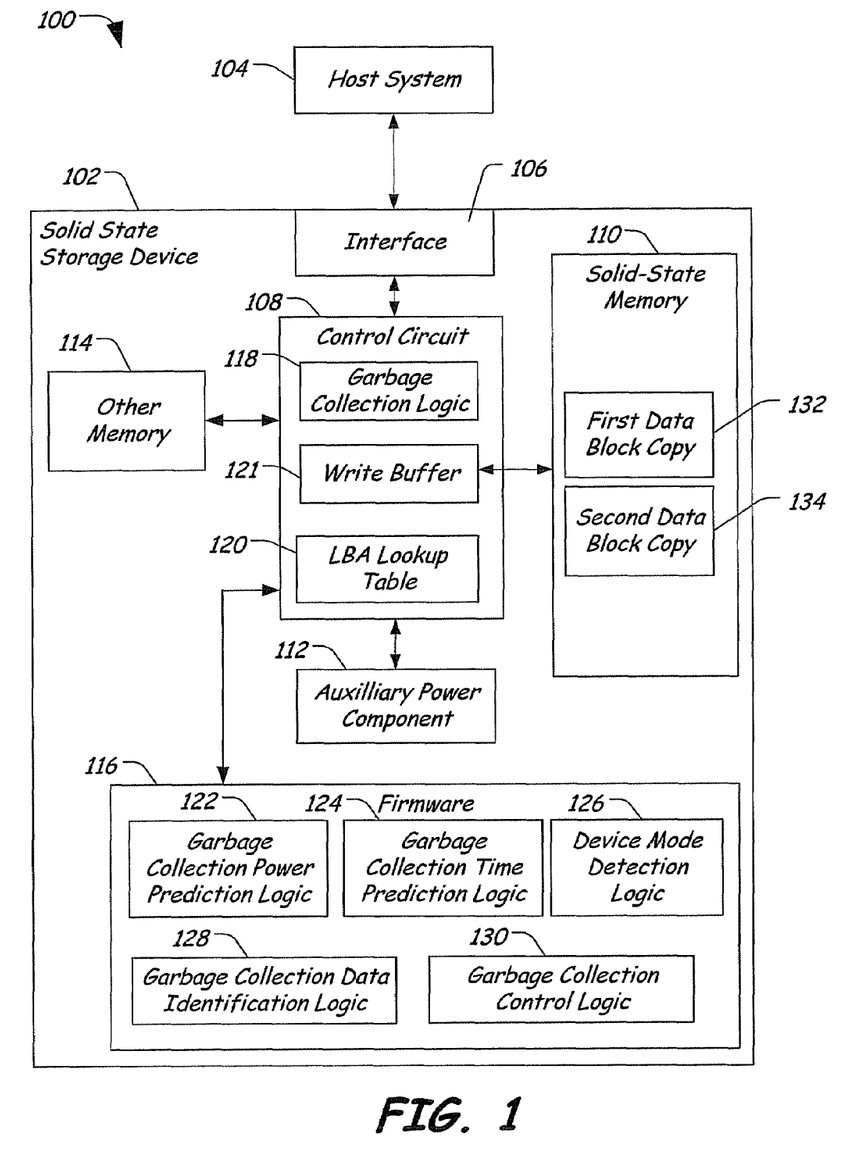
FIG. 1 is a block diagram of a particular illustrative embodiment of a solid-state storage device adapted to perform a garbage collection operation.

FIG. 1 is a block diagram of a particular illustrative embodiment of a system 100 including a storage device 102 with garbage collection logic. In a particular embodiment, the data storage device 102 is a solid-state memory device that is adapted to communicate with a host system 104 via an interface 106. The host system 104 may be a computing system, such a personal computer, a personal digital assistant (PDA), processing logic, another electronic device, or any combination thereof.

The data storage device 102 includes a control circuit 108 that is adapted to communicate with a storage media 110. In a particular embodiment, the control circuit 108 includes a processor adapted to execute processor-readable instructions. In a particular example, the storage media 110 is a solid-state storage media that is adapted to store both data blocks and meta-data related to the data blocks. Depending on the implementation, the solid-state memory can be a NAND flash memory, a NOR flash memory, other solid-solid state memory, or any combination thereof. The control circuit 108 also communicates with other memory 114, which can include flash memory, such as NAND flash memory, NOR flash memory, other solid-state memory, or any combination thereof. Further, the control circuit 108 is adapted to communicate with firmware 116, which may be a code NOR flash memory, such as the code NOR flash memory 234 illustrated in FIG. 2.

In a particular example, when the storage media 110 is a NAND flash solid-state memory, each flash page includes spare bytes. In a particular example, for single-level cell (SLC) NAND flash, there are 16 spare bytes for every 512 bytes of data or 64 spare bytes for each two-kilobyte page of data. Metadata, including logical block address (LBA) data, is stored in those spare bytes. In general, some solid-state storage devices, such as NAND flash memory, only allow write after erase operations and do not permit re-write operations. To improve write performance, the same logical block address (LBA) location is mapped to different physical locations inside of the NAND flash memory. However, such mappings introduce garbage, which is redundant data that has been overwritten but that still occupies physical space within the NAND flash. The term "garbage collection operation" refers to a process for removal of such stale or overwritten data.

The firmware 116 is adapted to store a plurality of instructions that are executable by the control circuit 108, including operating instructions for the storage device 102. The firmware 116 includes garbage collection power prediction logic 122 that is executable by the control circuit 108 to predict a garbage collection power needed to perform a garbage collection operation based on a number of pages to be copied during a garbage collection operation. Since a copy operation for each page uses a relatively consistent or known amount of power, a count of the pages to be copied provides an estimate of the amount of power needed to complete the operation. The firmware 116 also includes garbage collection time prediction logic 124 that is executable by the control circuit 108 to predict a garbage collection time needed to perform a garbage collection operation based on a number of pages to be copied during a garbage collection operation. In general, since copying of each page consumes a known amount of time, a count of the pages to be copied can be used to estimate the time needed to perform the operation.

The firmware 116 also includes device mode detection logic 126 that is adapted to detect an operating mode of the storage device 102. In a particular example, the operating mode of the storage device 102 can be an "idle" operating mode where power is conserved by placing particular circuitry of the storage device 102 in a reduced power/reduced operating cycle state. The operating mode of the storage device 102 can also be a full-power operating mode, which reflects power consumption during normal operation. In a particular embodiment, the control circuit 108 is adapted to control the operating mode of the storage device 102 and to place the storage device 102 into the idle operating mode after a period of inactivity.

The firmware 116 further includes garbage collection data identification logic 128 that is executable by the control circuit 108 to identify overwritten, duplicate, or stale data to be removed from the storage media 110. The garbage collection data identification logic 128 is also adapted to identify a particular data block to be copied, such as a largest redundant data block, a smallest redundant data block, another sized data block, or any combination thereof. The firmware 116 also includes garbage collection control logic 130 that is executable by the control circuit 108 to control a flow of a garbage collection process.

The control circuit 108 is also coupled to an auxiliary power component 112. In a particular embodiment, the auxiliary power component 112 can be a capacitor or a battery that is adapted to supply power to the storage device 102 under certain operating conditions. In a particular example, the auxiliary power component 112 can provide a power supply to the control circuit 108 and to at least one of the storage media 110, the other memory 114, and the firmware 116 to record data when power is unexpectedly turned off.

The control circuit 108 is adapted to load garbage collection logic 118 from the firmware 116. Further, the control circuit 108 is adapted to load a logical block address (LBA) lookup table 120. On power up, power down, and at various times during operation, a garbage collection operation is initiated to delete overwritten or stale data stored at the storage media 110. In a particular embodiment, the garbage collection operation can be initiated via an interrupt, based on a command received from the host system 104, self-initiated based on instructions stored at the firmware 116, or any combination thereof. Additionally, the control circuit 108 includes a write buffer 121 that is adapted to temporarily store data to be written to the storage media 110. In a particular example, the control circuit 108 is a processor adapted to execute instructions, and the write buffer 121 is a buffer memory, such as a random access memory (RAM) associated with the processor.

In a particular embodiment, the control circuit 108 executes the garbage collection logic 118 to initiate a garbage collection operation to remove redundant data from a storage media 110 of the storage device 102. In a particular embodiment, the control circuit 108 executes the device mode detection logic 126 to determine an operating mode of the storage device 102. If the storage device 102 is in an idle mode, the control circuit 108 executes the garbage collection control logic 130 to begin the garbage collection operation. In a particular example, the garbage collection control logic 130 may begin the garbage collection operation at a smallest free available unit of the control circuit 108 of the storage media 110. For example, if the control circuit 108 includes a multi-threaded processor, the garbage collection control logic 130 may initiate the garbage collection operation using one or more threads. In another example, if the control circuit 108 includes multiple processing cores, the garbage collection control logic 130 may initiate the garbage collection operation using a single processor core.

In another particular example, if the storage device 102 is in another mode, such as a full-power operating mode, the control circuit 108 is adapted to execute one of the garbage collection power prediction logic 122 and the garbage collection time prediction logic 124 to predict one of a power needed or a time needed to perform the garbage collection operation. The control circuit 108 uses the garbage collection control logic 130 to determine whether to abort the garbage collection operation. In a particular example, if the predicted power or the predicted time exceeds a corresponding threshold, the garbage collection operation can be aborted to conserve available resources for other operations. If the predicted power or the predicted time is less than the threshold, the control circuit 108 executes the garbage collection data identification logic 128 to identify a largest overwritten or stale data block for garbage collection. The control circuit 108 uses the garbage collection control logic 130 to copy the identified data block to a second location at the storage media 110 or to the write buffer 121 and to erase the freed block at the storage media 110. When the identified data is written to the write buffer 121, the write buffer 121 can be flushed at a next write operation.

In a particular embodiment, the firmware 116 can include one of the garbage collection power prediction logic 122 or the garbage collection time prediction logic 124. In a particular example, execution of either the garbage collection power prediction logic 122 or the garbage collection time prediction logic 124 by the control circuit 108 causes the control circuit 108 to count a number of pages to be copied. The amount of time or power needed to copy the pages can be determined based on the page count. Accordingly, in a particular example, the firmware 116 may store only one of the garbage collection power prediction logic 122 or the garbage collection time prediction logic 124, either of which can be used to determine processing cost of performing garbage collection.

In another particular embodiment, the device mode detection logic 126 may be omitted, and the power or time needed to perform a garbage collection operation may be predicted each time garbage collection is initiated. In another particular embodiment, the time and power needed may be predicted even if the device mode detection logic 126 determines that the storage device 102 is in an idle operating mode. In a particular example, when the storage device 102 is operating on battery power, it may be desirable to compare a predicted garbage collection power to available power to ensure that garbage collection is not initiated when there is insufficient power to complete the operation. In another particular example, it may be desirable to conserve power resources for core operations, rather than garbage collection, when available power is limited.

Figure 2:
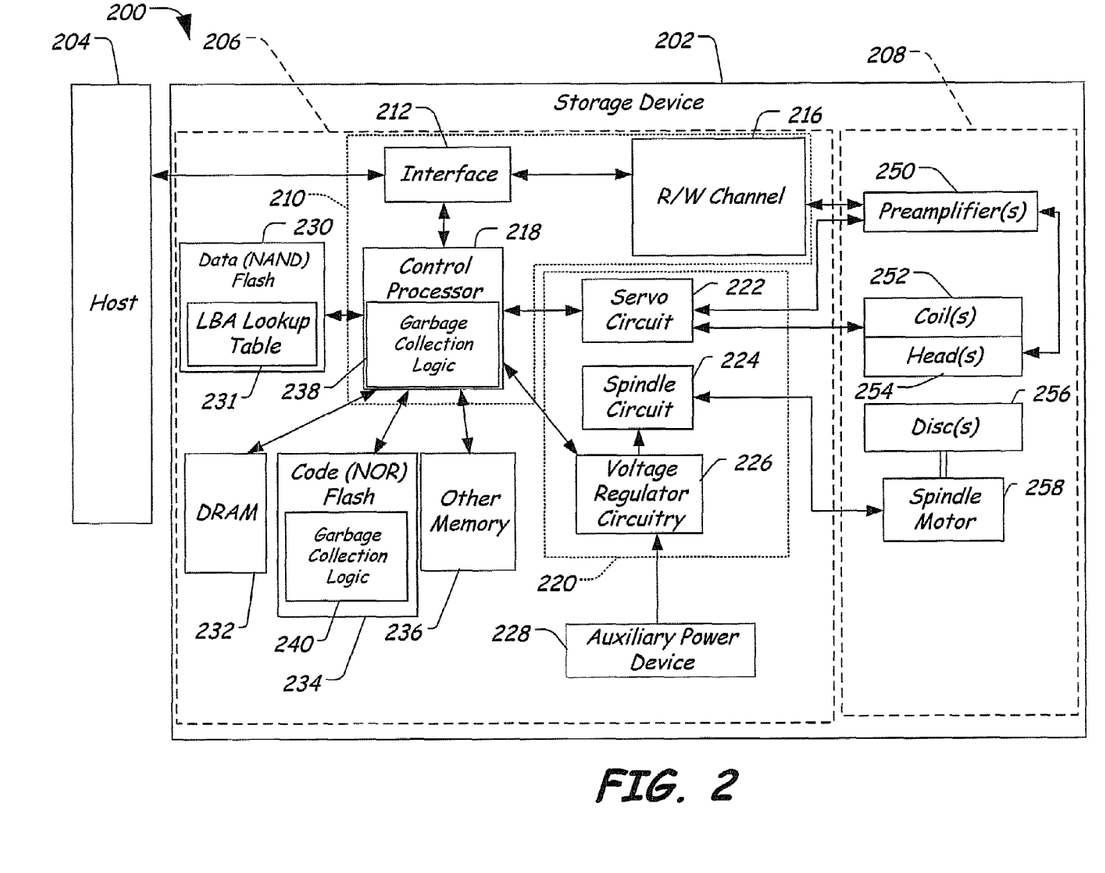
FIG. 2 is a block diagram of a particular illustrative embodiment of a hybrid storage device including both solid-state and rotatable storage media and adapted to perform a garbage collection operation.

FIG. 2 is a block diagram of a second particular illustrative embodiment of a system 200 including a hybrid storage device 202 with garbage collection logic. As used herein, the term "hybrid storage device" refers to a data storage device that includes both rotating storage media and solid-state storage media. The hybrid storage device 202 is adapted to communicate with a host system 204. In a particular embodiment, the host system 204 can be a computer, a processor, a personal digital assistant (PDA), another electronic device, or any combination thereof. In a particular embodiment, the hybrid storage device 202 can be a stand-alone storage device that communicates with the host system 204 via a universal serial bus (USB) or other interface. In another particular embodiment, the stand-alone hybrid storage device 202 can communicate with the host system 204 via a network.

The hybrid storage device 202 includes recording subsystem circuitry 206 and a head-disc assembly 208. The recording subsystem 206 includes storage device read/write control circuitry 210 and disc-head assembly control circuitry 220. The recording subsystem circuitry 206 includes an interface circuit 212, which includes a data buffer for temporarily buffering the data and a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes garbage collection logic 238 that is adapted to determine an operating mode of the storage device 102 and to initiate a garbage collection operation to remove redundant, stale, or overwritten data from a data NAND flash memory 230 or from one or more discs 256 when the storage device 102 is in an idle mode due to a period of inactivity. In a particular embodiment, the one or more discs 256 represent rotatable, non-volatile storage media adapted to store data, applications, metadata, or any combination thereof.

In a particular embodiment, the garbage collection logic 238 is adapted to predict a garbage collection power and/or a garbage collection time and to abort the garbage collection operation when the garbage collection power and/or garbage collection time exceeds corresponding threshold(s). Further, the garbage collection logic 238 is adapted to identify a block of data to be removed and to perform an erase (garbage collection process) on the identified block of data when the predicted garbage collection power and/or garbage collection time is less than the corresponding threshold(s). In a particular embodiment, the garbage collection logic 238 can include processor executable instructions that are stored at a code (NOR) flash 234 as garbage collection logic 240. The garbage collection logic 238 can be loaded and executed by the control processor 218.

The control processor 218 is coupled to a servo circuit 222 that is adapted to control the position of one or more read/write heads 254 relative to the one or more discs 256 as part of a servo loop established by the one or more read/write heads 254. Generally, the one or more read/write heads 254 are mounted to a rotary actuator assembly to which a coil 252 of a voice coil motor (VCM) is attached. As is known in the art, a VCM includes a pair of magnetic flux paths between which the coil 252 is disposed so that the passage of current through the coil causes magnetic interaction between the coil 252 and the magnetic flux paths, resulting in the controlled rotation of the actuator assembly and the movement of the one or more heads 254 relative to the surfaces of the one or more discs 256. The servo circuit 222 is used to control the application of current to the coil 252, and hence the position of the heads 254 with respect to the tracks of the one or more discs 256.

In general, the disc-head assembly control circuitry 220 includes the servo circuit 222 and includes a spindle circuit 224 that is coupled to a spindle motor 258 to control the rotation of the one or more discs 256. The hybrid storage device 202 also includes an auxiliary power device 228 that is coupled to voltage regulator circuitry 226 of the disc-head assembly control circuitry 220 and that is adapted to operate as a power source when power to the hybrid storage device 202 is lost. In a particular embodiment, the auxiliary power device 228 can be a capacitor or a battery that is adapted to supply power to the hybrid storage device 202 under certain operating conditions. In a particular example, the auxiliary power device 228 can provide a power supply to the recording subsystem assembly 206 and to the disc-head assembly 208 to record data to the one or more discs 256 when power is turned off. Further, the auxiliary power device 228 may supply power to the recording subsystem assembly 206 to record data to the data (NAND) flash 230 or to the code (NOR) flash 234 when power is turned off.

Additionally, the hybrid storage device 202 includes the data (NAND) flash 230, a dynamic random access memory (DRAM) 232, the code (NOR) flash 234, other memory 236, or any combination thereof. In a particular embodiment, the code (NOR) flash 234 is accessible to the control processor 218 and is adapted to store the garbage collection logic instructions 240. In a particular embodiment, the data (NAND) flash 230 may store a logical block address (LBA) lookup table 231 that represents a mapping of logical block addresses to physical memory locations within the one or more discs 256.

In a particular embodiment, the control processor 218 is adapted to perform a garbage collection operation on redundant, stale, or overwritten data stored at the data (NAND) flash 230, at the one or more discs 256, or any combination thereof. In a particular example, the data collection operation can be initiated via an interrupt, based on a command received from the host system 204, based on a self-initiated based on instructions stored at the code (NOR) flash 234, based on another initiation signal, or any combination thereof.

In a particular illustrative embodiment, the control processor 218 is adapted to load the garbage collection logic 240 into a processor memory (not shown) from the code (NOR) flash 234 and to execute the garbage collection logic 238. The garbage collection logic 238 is adapted to predict at least one of a garbage collection time and a garbage collection power needed to perform a garbage collection operation. The garbage collection logic 238 is adapted to compare the predicted time and/or power to corresponding thresholds and to abort the garbage collection operation if the predicted time and/or power exceeds the corresponding thresholds. In a particular example, by selectively aborting the garbage collection operation, access time to the one or more discs 256 and to the data (NAND) flash 230 can be enhanced, since processing power/cycles of the control processor 218 are not consumed if the time/power would interfere with other operations.

In a particular example, the garbage collection logic 238 includes an operating mode detection feature to determine an operating mode of the storage device 202, such as an "idle" operating mode or a "full-power" operating mode. The garbage collection logic 238 may be adapted to skip the garbage collection operation when the storage device 202 is in a full-power operating mode and to perform garbage collection operations when the storage device 202 is in the idle mode, so that processing cycles of the control processor 218 are not consumed by garbage collection during normal operation. In an alternative embodiment, the garbage collection logic 238 is adapted to perform a first garbage collection operation when the storage device 202 is in an idle operating mode and to perform a second garbage collection operation when the storage device 202 is an operating mode other than the idle operating mode. For example, the first garbage collection operation may be a garbage collection operation without predicting a garbage collection parameter. The second garbage collection operation may include predicting a garbage collection parameter (such as time or power consumption) prior to performing garbage collection and aborting the garbage collection operation when the garbage collection parameter exceeds a threshold.

In a particular embodiment, when the power or time thresholds of the storage device 202 are not exceeded and/or the storage device 202 is in an idle mode of operation (i.e., a reduced power mode), the control processor 218 is adapted to locate a largest data block for garbage collection by searching a longest sequential data block in the data (NAND) flash 230 or the one or more discs 256. The garbage collection process (including copying the identified block to a new memory location and erasure of the freed data block) can proceed according to a desired process.

In another particular embodiment, rather than copying data from one location to another within the data (NAND) flash 230 or the one or more discs 256, the garbage collection logic 238 causes the control processor 218 to copy the overwritten data to a write buffer associated with the control processor 218, with the interface 212, or with the read/write channel 216. During a next write operation, the write buffer can be flushed to erase the data. In a particular example, if garbage collection is to be performed at the one or more discs 256, the predicted power or time may be determined as an average spindle power associated with the spindle motor 258 and the spindle circuit 224 or an average erase time associated with the one or more discs 256.

In general, the storage devices 102 and 202 illustrated in FIGS. 1 and 2 are adapted to predict garbage collection time and/or power before performing garbage collection operations. Further, instead of a need-based garbage collection process that is initiated only when the storage media 110 or the data (NAND) flash 230, illustrated in FIGS. 1 and 2 respectively, are full, the garbage collection logic 118 and 238 illustrated in FIGS. 1 and 2 can be executed to perform a garbage collection operation when the storage device 102 or 202 are in an idle mode of operation. Further, in a particular embodiment, a write buffer, such as the write buffer 121 illustrated in FIG. 1, can be used to store the overwritten data until a next write operation, at which time the write buffer 121 can be flushed.

In a particular embodiment, the storage devices 102 and 202 illustrated in FIGS. 1 and 2 can include two or more solid-state memory chips with single or multiple data paths. Further, the storage devices 102 and 202 illustrated in FIGS. 1 and 2 can be hybrid hard disc storage devices, solid-state storage devices, universal serial bus (USB) flash storage devices, other data storage systems, or any combination thereof. In a particular example, the particular garbage collection logic 118 and 238 illustrated in FIGS. 1 and 2 may also be applied to data synchronization when there is more than one level of cache included in the storage devices 102 and 202. In a particular example, the more than one level of cache can include a second dynamic random access memory (DRAM) cache, a media cache, other levels of cache memory, or any combination thereof.

Figure 3:
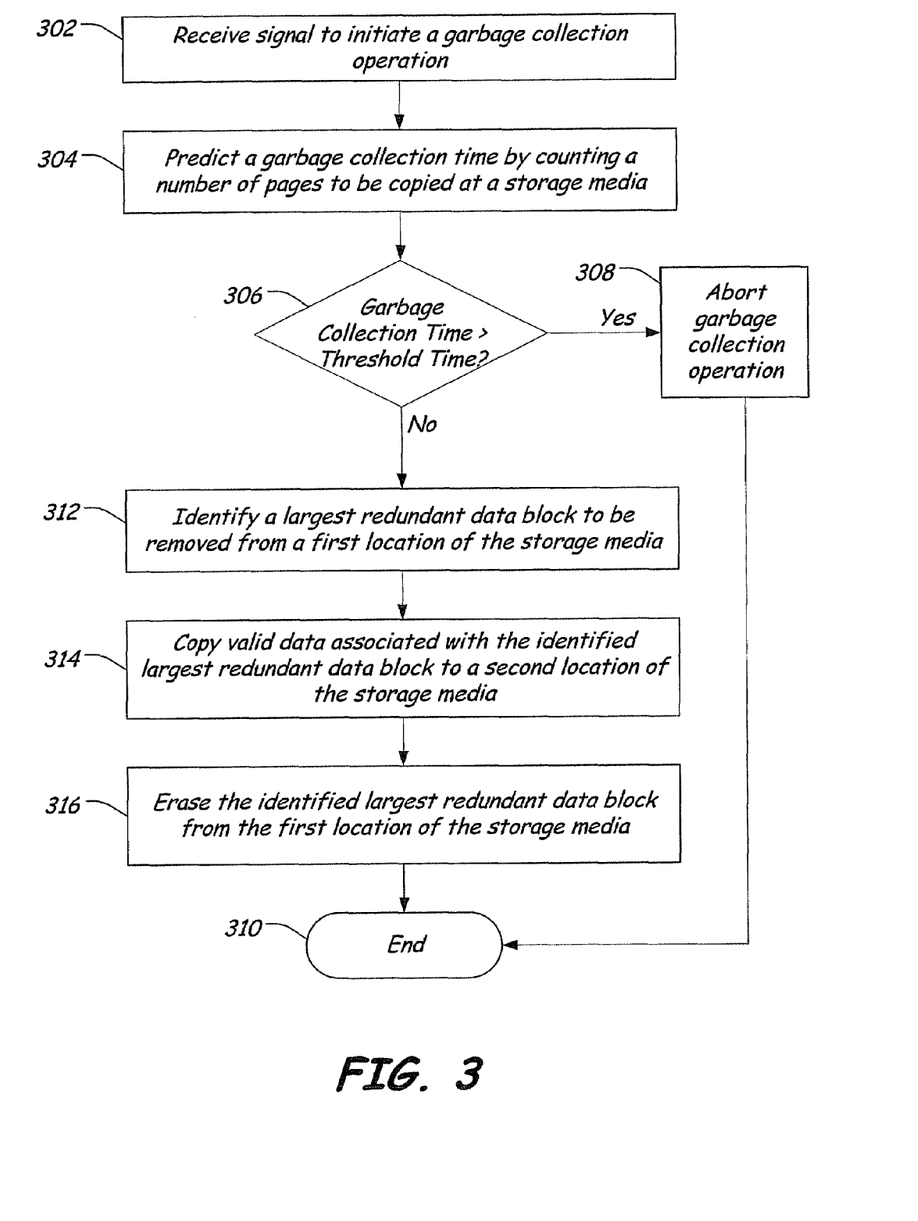
FIG. 3 is a flow diagram of a particular illustrative embodiment of a method of performing a garbage collection operation.

FIG. 3 is a flow diagram of a particular illustrative embodiment of a method of performing a garbage collection operation. At 302, a signal is received to initiate a garbage collection operation. In a particular example, the garbage collection operation includes one or more steps to identify and erase overwritten or stale data that is stored at a storage media. In a particular embodiment, the garbage collection operation can be initiated based on a received interrupt signal, based on a command received from a host system (such as the host systems 104 and 204 illustrated in FIGS. 1 and 2, respectively), based on a self-initiated instruction stored at a firmware of the storage device, based on another signal, or any combination thereof. Moving to 304, a garbage collection time is predicted by counting a number of pages to be copied at a storage media. In a particular example, the garbage collection operation includes identifying data to be erased and predicting the time based on the identified data. In another particular example, the garbage collection operation includes predicting the time based on a total garbage collection process for the storage media.

Continuing to 306, if the predicted garbage collection time exceeds a threshold time, the method advances to 308 and the garbage collection operation is aborted. In a particular example, the garbage collection operation may be performed at a later time, when more system resources are available. The method is terminated at 310.

Returning to 306, if the predicted garbage collection time does not exceed the threshold time, the method advances to 312 and a largest redundant (stale or overwritten) data block to be removed is identified from a first location of the storage media. Proceeding to 314, valid data associated with the identified largest redundant data block is copied to a second location of the storage media. In an alternative embodiment, the valid data may be copied to a write buffer that is flushed at a next write operation. Advancing to 316, the identified largest redundant data block is erased from the first location of the storage media. The method terminates at 310.

Figure 4:
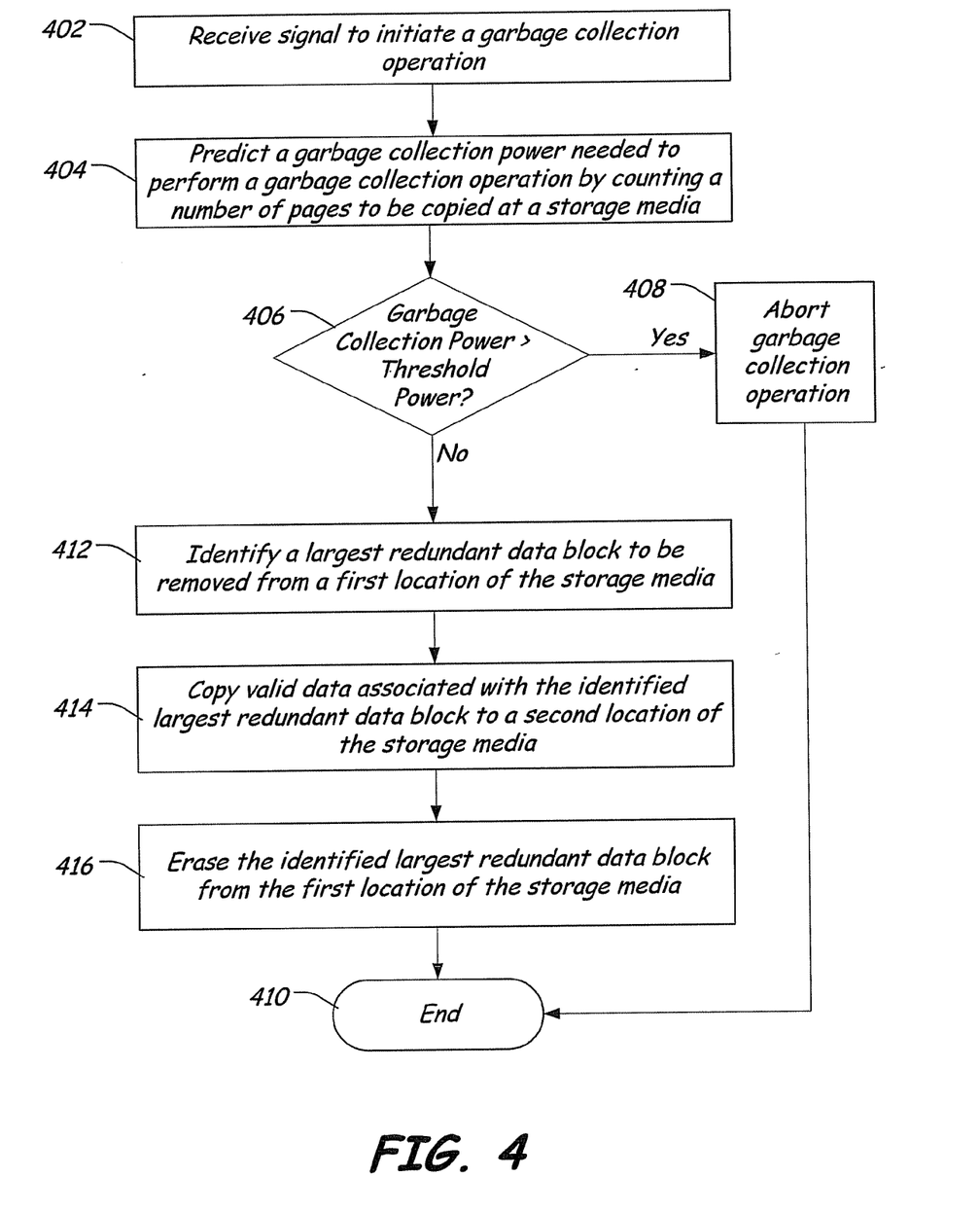
FIG. 4 is a flow diagram of a second particular illustrative embodiment of a method of performing a garbage collection operation.

FIG. 4 is a flow diagram of a second particular illustrative embodiment of a method of performing a garbage collection operation. At 402, a signal is received to initiate a garbage collection operation. In a particular example, the garbage collection operation includes one or more steps to identify and erase overwritten or stale data that is stored at a storage media. In a particular embodiment, the garbage collection operation can be initiated based on a received interrupt signal, based on a command received from a host system (such as the host system 104 illustrated in FIG. 1), based on an interrupt associated with a peripheral device, based on a self-initiated instruction stored at firmware of the storage device, based on another signal, or any combination thereof. Moving to 404, a garbage collection power is predicted by counting a number of pages to be copied at a storage media. In a particular example, the garbage collection operation includes identifying data to be erased and predicting the power needed to perform the garbage collection operation based on the identified data. In another particular example, the garbage collection operation includes predicting the power based on a total garbage collection process for the storage media.

Continuing to 406, if the predicted garbage collection power exceeds a threshold power, the method advances to 408 and the garbage collection operation is aborted. The method is terminated at 410.

Returning to 406, if the predicted garbage collection power does not exceed the threshold power, the method advances to 412 and a largest redundant (stale or overwritten) data block to be removed is identified from a first location of the storage media. Proceeding to 414, valid data associated with the identified largest redundant data block is copied to a second location of the storage media. In an alternative embodiment, the valid data may be copied to a write buffer that is flushed at a next write operation. Advancing to 416, the identified largest redundant data block is erased from the first location of the storage media. The method terminates at 410.

Figure 5:
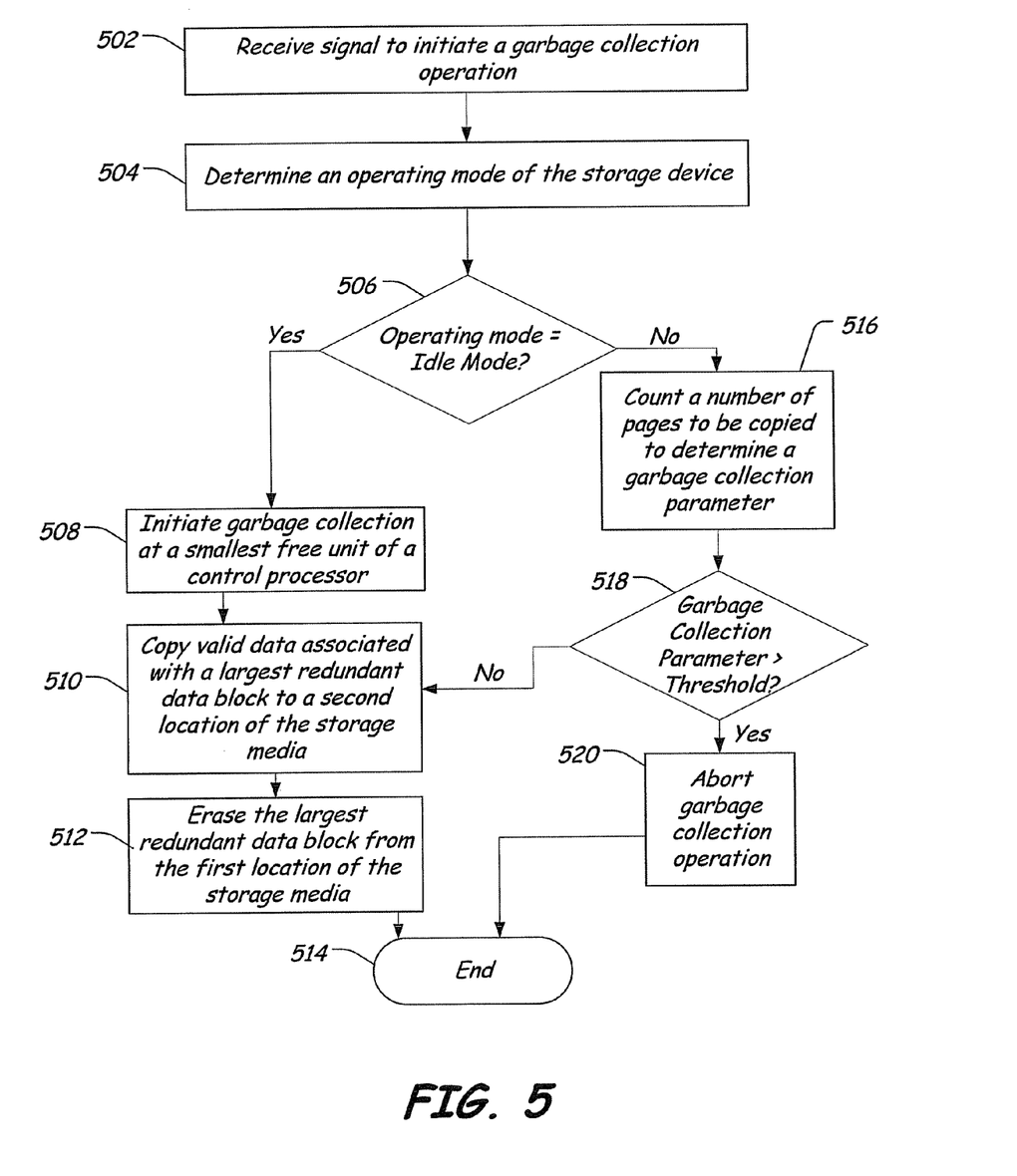
FIG. 5 is a flow diagram of a third particular illustrative embodiment of a method of performing a garbage collection operation.

FIG. 5 is a flow diagram of a third particular illustrative embodiment of a method of performing a garbage collection operation. At 502, a signal is received to initiate a garbage collection operation. In a particular example, the garbage collection operation includes one or more steps to identify and erase overwritten or stale data that is stored at a storage media. In a particular embodiment, the garbage collection operation can be initiated based on a received interrupt signal, based on a command received from a host system (such as the host system 104 illustrated in FIG. 1), based on an interrupt associated with a peripheral device, based on a self-initiated instruction stored at firmware of the storage device, based on another signal, or any combination thereof. Moving to 504, an operating mode of the storage device is determined. The operating mode of the storage device can include an idle mode for reduced power consumption during periods of inactivity and a full-power mode for normal operation.

Continuing to 506, if the operating mode is the idle mode of operation, the method advances to 508 and garbage collection is initiated at a smallest free unit of the control processor. Advancing to 510, valid data associated with the largest redundant data block is copied to a second location of the storage media. In an alternative embodiment, the valid data may be copied to a write buffer that is flushed at a next write operation. Advancing to 512, the identified largest redundant data block is erased from the first location of the storage media. The method terminates at 514.

Returning to 506, if the operating mode is not an idle mode of operation, the method proceeds to 516 and a number of pages to be copied is counted to determine a garbage collection parameter. In a particular embodiment, the garbage collection parameter can be a garbage collection power or a garbage collection time needed to complete the garbage collection operation. Continuing to 518, if the garbage collection parameter exceeds a threshold, the method advances to 520 and the garbage collection operation is aborted. The method terminates at 514.

Returning to 518, if the garbage collection parameter does not exceed a threshold, the method advances to 510 and valid data associated with the largest redundant data block is copied to a second location of the storage media. In an alternative embodiment, the valid data may be copied to a write buffer that is flushed at a next write operation. Advancing to 512, the identified largest redundant data block is erased from the first location of the storage media. The method terminates at 514.

Figure 6:
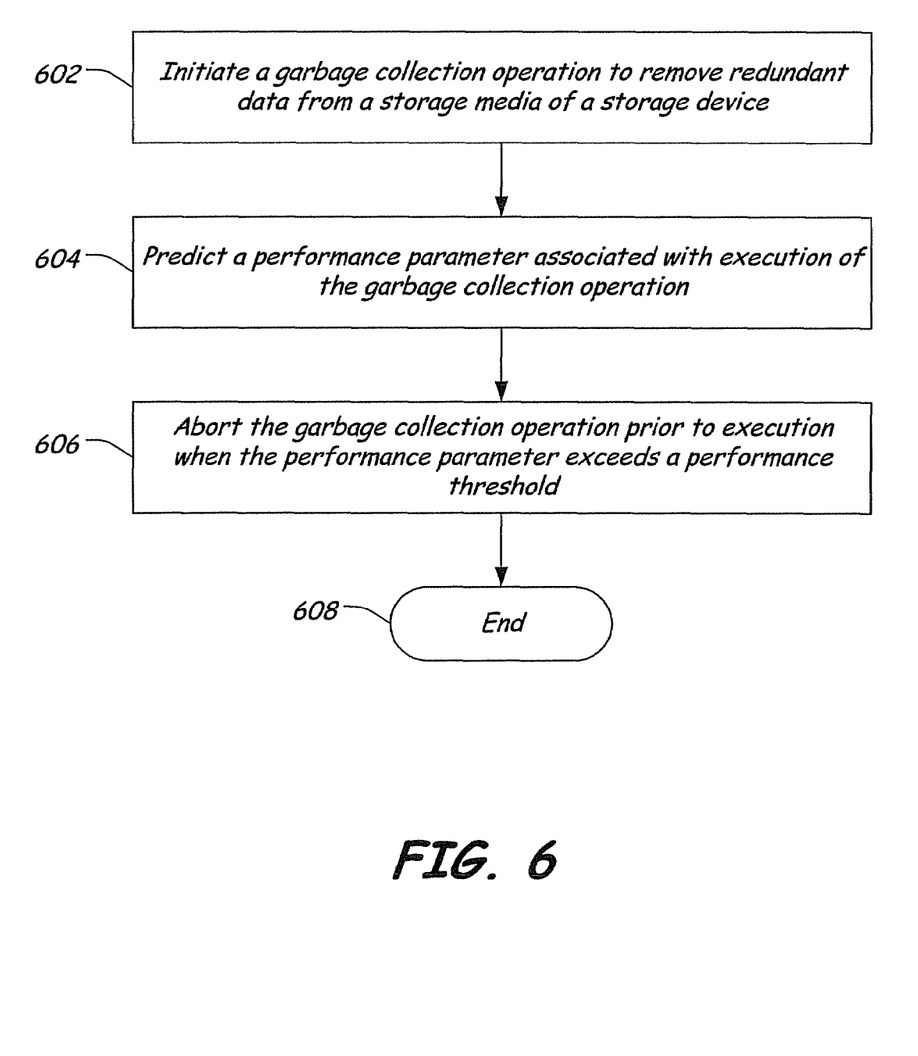
FIG. 6 is a flow diagram of a fourth particular illustrative embodiment of a method of performing a garbage collection operation.

FIG. 6 is a flow diagram of a fourth particular illustrative embodiment of a method of performing a garbage collection operation. At 602, a garbage collection operation is initiated to remove redundant data from a storage media of a storage device. In a particular embodiment, the garbage collection operation can be initiated based on a received interrupt signal, based on a command received from a host system (such as the host system 104 illustrated in FIG. 1), based on an interrupt associated with a peripheral device, based on a self-initiated instruction stored at firmware of the storage device, based on another signal, or any combination thereof.

Advancing to 604, a performance parameter associated with execution of the garbage collection operation is predicted. In a particular example, the performance parameter is predicted by predicting a garbage collection time needed to perform the garbage collection operation, which includes counting a number of pages to be copied to a memory location, where a copy operation includes an associated average time for each page. In another particular example, the performance parameter is predicted by predicting a garbage collection power needed to perform the garbage collection operation, which includes counting a number of pages to be copied to a memory location, where a copy operation includes an associated average power required to copy each page. Continuing to 606, the garbage collection operation is aborted prior to execution when the performance parameter exceeds a performance threshold. In a particular example, when the performance parameter does not exceed the performance threshold, the garbage collection operation is allowed to proceed. The method terminates at 608.

In a particular embodiment, the method also includes determining an operating mode of the storage device, where the operating mode includes at least one of an active mode and an idle mode of operation. The method also includes executing the garbage collection operation without predicting the performance parameter when the storage device is in the idle mode.

In another particular embodiment, the garbage collection operation is performed by determining a redundant data block to remove from the storage media, copying valid data of the determined redundant data block to a free location, and removing the redundant data block from the storage media. In a particular example, the free location is a write buffer.

Figure 7:
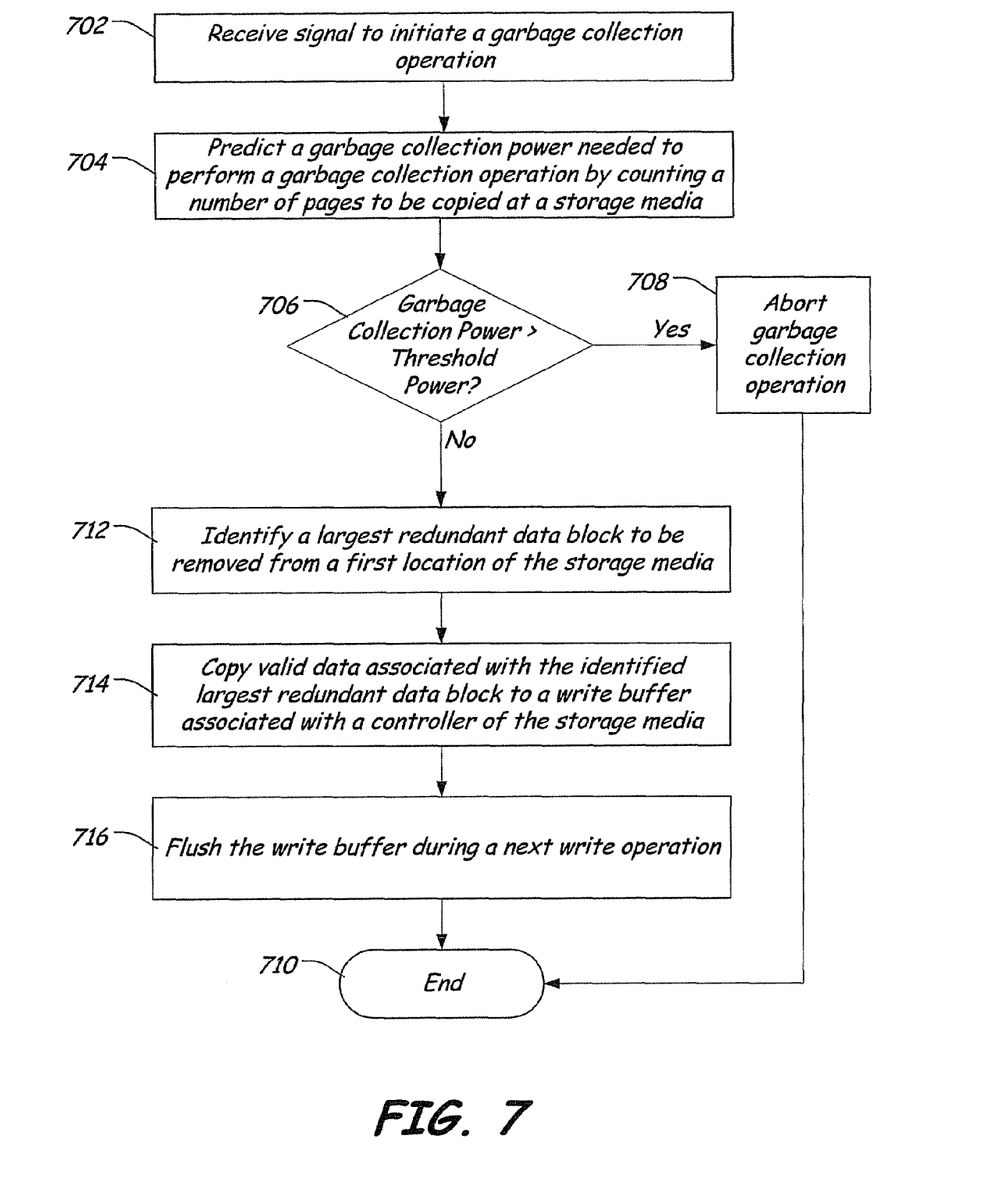
FIG. 7 is a flow diagram of a fifth particular illustrative embodiment of a method of performing a garbage collection operation.

FIG. 7 is a flow diagram of a fifth particular illustrative embodiment of a method of performing a garbage collection operation. At 702, a signal is received to initiate a garbage collection operation. In a particular example, the garbage collection operation includes one or more steps to identify and erase overwritten or stale data that is stored at a storage media. In a particular embodiment, the garbage collection operation can be initiated based on a received interrupt signal, based on a command received from a host system, such as the host system 104 illustrated in FIG. 1, based on a self-initiated instruction stored at firmware of the storage device, or any combination thereof. Moving to 704, a garbage collection power is predicted by counting a number of pages to be copied at a storage media. In a particular example, the garbage collection operation includes identifying data to be erased and predicting the power needed to perform the garbage collection operation based on the identified data. In another particular example, the garbage collection operation includes predicting the power based on a total garbage collection process for the storage media.

Continuing to 706, if the predicted garbage collection power exceeds a threshold power, the method advances to 708 and the garbage collection operation is aborted. The method is terminated at 710.

Returning to 706, if the predicted garbage collection power does not exceed the threshold power, the method advances to 712 and a largest redundant (stale or overwritten) data block to be removed is identified from a first location of the storage media. Proceeding to 714, valid data associated with the identified largest redundant data block is copied to a write buffer associated with a controller of the storage media. In a particular example, the write buffer may be a data buffer within a control processor, a data buffer within a read/write channel, a write buffer within an interface of the storage device, another temporary storage, or any combination thereof. Continuing to 716, the write buffer is flushed during a next write operation. The method terminates at 710.

In conjunction with the systems and methods illustrated in FIGS. 1-7 and described above, a system is provided with garbage collection logic that selectively performs a garbage collection operation based on at least one of an operating mode of the storage device, a predicted garbage collection time, a predicted garbage collection power, or any combination thereof. In a particular example, the system is adapted to enhance performance of a storage device by selectively aborting a garbage collection operation when a garbage collection parameter (such as time or power) exceeds a performance threshold that would adversely impact performance of the storage device. For example, during operation, power consumption or time associated with garbage collection may usurp processes that might otherwise be needed by other processes, thereby impacting performance. Further, in a particular example, the storage device includes garbage collection logic that is adapted to utilize an available write buffer as a temporary storage for the data to be removed, so that the data can be flushed in a next write operation.

Although the present invention has been described with reference to preferred embodiments, workers skilled in the art will recognize that changes may be made in form and detail without departing from the spirit and scope of the invention.

What is claimed is:

1. A controller associated with a device, the controller adapted to perform functions comprising:
    predicting a performance parameter associated with performance of a garbage collection operation in response to the device being in an active mode operating with full power consumption of a substantially constant power supply, the performance parameter being at least one of a garbage collection power or a garbage collection time, and aborting the garbage collection operation in response to the predicted performance parameter exceeding a threshold;
    performing the garbage collection operation without predicting the performance parameter in response to the device being in an idle mode operating with reduced power consumption of the substantially constant power supply; and
    identifying a substantially smallest data block to initiate the garbage collection operation at the substantially smallest data block in the idle mode.

2. The controller of claim 1, wherein, in the active mode, the controller is configured to abort the garbage collection operation in response to a garbage collection time exceeding a time threshold, and wherein, in the active mode, the controller is configured to identify a number of pages to be copied from a storage medium and configured to predict the garbage collection time based on the identified number of pages.

3. The controller of claim 1, wherein, in the active mode, the performance parameter comprises a garbage collection power, and wherein, in the active mode, the controller is configured to identify a number of pages to be copied from a storage medium and configured to predict the garbage collection power based on the identified number of pages.

4. The controller of claim 1, wherein the controller is configured to abort the garbage collection operation in response to the device being in the active mode and in response to a predicted garbage collection power exceeding an available power related to a power source associated with a storage medium.

5. The controller of claim 1, wherein the controller is adapted to identify a largest redundant data block to remove from a storage medium, to copy valid data of the largest redundant data block to a free location of the storage media, and to erase the largest redundant data block.

6. The controller of claim 1, wherein the controller is coupled to a write buffer that is coupled to a storage medium and that is adapted to store a data block, wherein the controller is adapted to perform the garbage collection operation by copying redundant data to the write buffer and by flushing the write buffer during a next write operation.

7. The controller of claim 1, wherein the controller is adapted to control read/write access to a solid-state storage medium.

8. A storage device comprising:
    a solid-state memory adapted to store multiple data blocks including one or more redundant data blocks; and
    a controller adapted to perform a garbage collection operation to remove redundant data without predicting a performance parameter associated with performance of the garbage collection operation in response to the storage device being in an idle mode operating with reduced power consumption of a substantially constant power supply, the controller is further adapted to predict a performance parameter associated with performance of the garbage collection operation and to abort the garbage collection operation in response to the predicted performance parameter exceeding a performance threshold, in response to the storage device being in an active mode operating with full power consumption of the substantially constant power supply, wherein the predicted performance parameter comprises at least one of a garbage collection power and a garbage collection time, and
    wherein the controller is further configured to identify a substantially smallest data block and configured to initiate the garbage collection operation at the substantially smallest data block in the idle mode.

9. The storage device of claim 8, wherein, in the active mode, the controller is configured to determine a number of pages to be copied during the garbage collection operation.

10. The storage device of claim 9, wherein, in the active mode, the performance parameter is the garbage collection time, and wherein the garbage collection time comprises a time needed to perform the garbage collection operation based on the determined number of pages.

11. The storage device of claim 8, further comprising:
    a rotatable storage media to store user data;
    a spindle motor adapted to rotate the rotatable storage media; and
    a read/write assembly responsive to the controller and adapted to read and write data from and to the rotatable storage media;
    wherein the controller is adapted to store meta-data associated with the user data at the solid-state memory, and wherein the controller is adapted to perform the garbage collection operation on redundant data stored at the solid-state memory and at the rotatable storage media.

12. The storage device of claim 8, wherein the solid-state memory comprises one of a NAND flash memory and a NOR flash memory.

13. A method comprising:
receiving, by a controller of a device, a signal to initiate a garbage collection operation;
determining, by the controller, an operating mode of the device in response to receiving the signal;
predicting, by the controller, a performance parameter associated with performance of the garbage collection operation upon determining that the device is in an active mode operating with full power consumption of a substantially constant power supply;
performing, by the controller, the garbage collection operation without predicting the performance parameter upon determining that the device is in an idle mode operating with reduced power consumption of the substantially constant power supply; and
identifying, by the controller, a substantially smallest data block to initiate the garbage collection operation at the substantially smallest data block in the idle mode.

14. The method of claim 13, wherein the predicted performance parameter indicates at least one of a power or time that would be consumed executing the garbage collection operation, wherein predicting the time that would be consumed executing the garbage collection operation comprises counting a number of pages to be copied to a memory location, wherein a copy operation includes an associated average time for each page.

15. The method of claim 13, wherein the predicted performance parameter indicates at least one of a power or time that would be consumed executing the garbage collection operation, wherein predicting the power that would be consumed executing the garbage collection operation comprises counting a number of pages to be copied to a memory location, wherein a copy operation includes an associated average power required to copy each page.

16. The method of claim 13, wherein performing the garbage collection operation comprises copying redundant data to a write buffer and flushing the write buffer during a next write operation.

* * * * *

UNITED STATES PATENT AND TRADEMARK OFFICE
CERTIFICATE OF CORRECTION

PATENT NO. : 8,880,775 B2
APPLICATION NO. : 12/142915
DATED : November 4, 2014
INVENTOR(S) : Stefanus Stefanus et al.

It is certified that error appears in the above-identified patent and that said Letters Patent is hereby corrected as shown below:

On the Title Page

Page 2 item [56], insert reference number -- 2005/0198088 09/2005 Subramoney et al. 707/206 --.

Signed and Sealed this
Ninth Day of January, 2018

Joseph Matal
*Performing the Functions and Duties of the
Under Secretary of Commerce for Intellectual Property and
Director of the United States Patent and Trademark Office*